US012521890B2

(12) United States Patent
Yang et al.

(10) Patent No.: US 12,521,890 B2
(45) Date of Patent: Jan. 13, 2026

(54) METHOD AND APPARATUS FOR ROBOT CONTROL, DEVICE, ROBOT, AND MEDIUM

(71) Applicant: BEIJING YOUZHUJU NETWORK TECHNOLOGY CO., LTD., Beijing (CN)

(72) Inventors: Taozheng Yang, Beijing (CN); Ya Jing, Beijing (CN); Hongtao Wu, Beijing (CN); Kuankuan Sima, Beijing (CN); Qie Sima, Beijing (CN); Tao Kong, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/659,595

(22) Filed: May 9, 2024

(65) Prior Publication Data
US 2024/0375287 A1 Nov. 14, 2024

(30) Foreign Application Priority Data
May 9, 2023 (CN) .......................... 202310520089.3

(51) Int. Cl.
*B25J 9/16* (2006.01)
(52) U.S. Cl.
CPC ........... *B25J 9/1697* (2013.01); *B25J 9/1664* (2013.01)
(58) Field of Classification Search
CPC ...... B25J 9/1697; B25J 9/1664; B25J 9/1669; B25J 9/1633; B25J 5/007; B25J 9/1602
See application file for complete search history.

(56) References Cited

U.S. PATENT DOCUMENTS

| | | | |
|---|---|---|---|
| 2016/0297068 A1 | 10/2016 | Thibodeau et al. | |
| 2018/0345483 A1* | 12/2018 | Sirkett | B25J 9/1612 |
| 2019/0202070 A1* | 7/2019 | Nakagawa | B25J 9/1612 |
| 2019/0248003 A1* | 8/2019 | Nagarajan | B25J 9/163 |
| 2020/0346347 A1* | 11/2020 | Sankai | B25J 13/082 |
| 2023/0278198 A1* | 9/2023 | Wang | B25J 9/163 |
| | | | 700/259 |

FOREIGN PATENT DOCUMENTS

| | | | |
|---|---|---|---|
| CN | 103926845 A | 7/2014 | |
| CN | 107901041 A | 4/2018 | |
| WO | WO-2018193130 A1 * | 10/2018 | B25J 9/1612 |
| WO | 2022021156 A1 | 2/2022 | |

OTHER PUBLICATIONS

WO2018193130 translation.*
First Office Action for Chinese Application No. 202310520089.3, mailed Apr. 24, 2025, 17 pages.

* cited by examiner

*Primary Examiner* — Robert T Nguyen

(57) ABSTRACT

Embodiments of the disclosure relate to a method and apparatus for controlling a robot, a device, a robot, and a medium. The method for controlling a robot according to the embodiments of the disclosure includes determining, based on a real-time image captured by the robot at a first moment, a reference motion parameter and a reference control force corresponding to the real-time image. The method further includes determining a target pose and a target control force of the robot at a second moment after the first moment according to the reference motion parameter and the reference control force. The method further includes determining a target action of the robot at the second moment according to the target pose and the target control force.

17 Claims, 7 Drawing Sheets

METHOD AND APPARATUS FOR ROBOT CONTROL, DEVICE, ROBOT, AND MEDIUM

CROSS-REFERENCE TO RELATED APPLICATION(S)

This application claims priority to Chinese Application No. 202310520089.3 filed in May 9, 2023, the disclosure of which is incorporated herein by reference in its entity.

FIELD

Embodiments of the disclosure relate generally to the field of automation, and more particularly to a method and apparatus for controlling a robot, an device, a robot, and a medium.

BACKGROUND

In recent years, there has been a growing academic and industrial interest in the study of manipulation capabilities of robots, and the forms of robots have gradually evolved from fixed mechanical arms and mobile unmanned vehicles to more complex mobile manipulation configurations.

A mobile operation combines two fundamental robot abilities, that is, maneuverability and an object operation ability. These two abilities greatly expand the applications of robots in the real world compared to a static operation. For example, the mobile operation enables the robot to complete tasks involving operations in a large workspace.

SUMMARY

Embodiments of the disclosure provide a technical solution for controlling a robot.

According to a first aspect of the disclosure, a method for controlling a robot is provided. The method includes determining, based on a real-time image captured by the robot at a first moment, a reference motion parameter and a reference control force corresponding to the real-time image. The method further includes determining a target pose and a target control force of the robot at a second moment after the first moment according to the reference motion parameter and the reference control force. The method further includes determining a target action of the robot at the second moment according to the target pose and the target control force.

According to a second aspect of the disclosure, an apparatus for controlling a robot is provided. The apparatus includes a retrieving module 710 configured to determine, based on a real-time image captured by the robot at a first moment, a reference motion parameter and a reference control force corresponding to the real-time image. The apparatus further includes a predicting module 720 configured to determine a target pose and a target control force of the robot at a second moment after the first moment according to the reference motion parameter and the reference control force. The apparatus further includes a determining module 730 configured to determine a target action of the robot at the second moment according to the target pose and the target control force.

According to a third aspect of the disclosure, an electronic device is provided. The electronic device includes a processor, and a memory coupled to the processor. The memory stores an instruction. When executed by the processor, the instruction causes the electronic device to execute the method according to the first aspect of the disclosure.

According to a fourth aspect of the disclosure, a robot is provided. The robot includes a mechanical arm, a chassis, and the electronic device according to the third aspect of the disclosure.

According to a fifth aspect of the disclosure, a computer-readable storage medium is provided. The computer-readable storage medium stores a computer-executable instruction. The computer-executable instruction is executed by a processor to implement the method according to the first aspect of the disclosure.

It should be noted that the summary is provided to introduce a selection of concepts in a simplified form that are further described below in detailed embodiments. The summary is not intended to identify key features or essential features of the disclosure, nor is it intended to limit the scope of the disclosure.

BRIEF DESCRIPTION OF THE DRAWINGS

The above and other objects, features, and advantages of the disclosure will become more clear and apparent from the more detailed description of embodiments of the disclosure in conjunction with the accompanying drawings. In the figures.

The same or similar reference numerals typically refer to the same or similar elements throughout all the drawings.

DETAILED DESCRIPTION OF EMBODIMENTS

Figure 1:
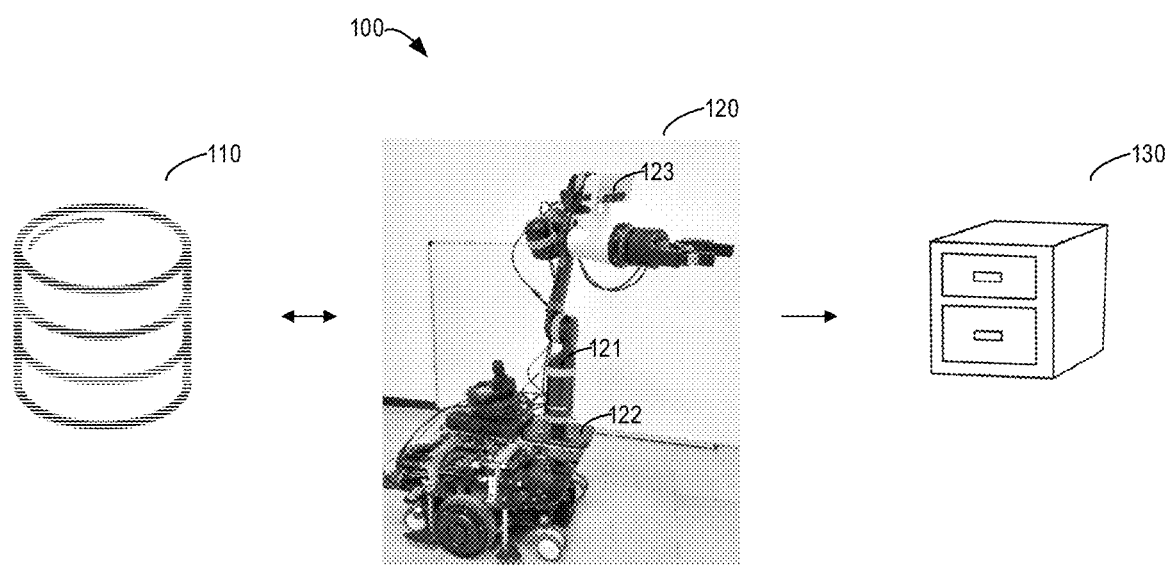
FIG. 1 is a schematic diagram illustrating an example environment in which a method and/or process according to embodiments of the disclosure may be implemented.

It should be understood that before using the technical solutions disclosed in various embodiments of the disclosure, a user should be informed of the type, use range, use scene, etc. of personal information (for example, captured images) involved in the disclosure in an appropriate manner according to relevant laws and regulations, and authorization of the user should be obtained.

It should be understood that data involved in the technical solutions of the disclosure (including but not limited to the data, obtaining or use of the data) should comply with requirements of corresponding laws, regulations and relevant provisions.

Embodiments of the disclosure are described in more detail below with reference to the drawings. Although some embodiments of the disclosure are shown in the drawings, it should be understood that the disclosure may be embodied in various forms and should not be construed as being limited to the examples set forth herein. On the contrary, these examples are provided, such that the disclosure will be understood more thoroughly and completely. It should also be understood that the drawings and embodiments of the disclosure are for illustrative purposes merely and are not intended to limit the scope of protection of the disclosure.

In the description of the embodiments of the disclosure, the terms "comprise" or "include" and their variations should be understood as open-ended, that is, "comprise but not limited to" and "include but not limited to". The term "based on" should be understood as "based at least in part on". The term "an embodiment" or "the embodiment" should be understood as "at least one embodiment". The terms "first", "second", etc. may refer to different or the same object, unless explicitly indicated to be different.

As mentioned above, more and more researchers are beginning to focus on an operation ability of robots, and forms of robots are becoming more and more abundant. Maneuverability and an object operation ability of a robot is one of its most important characteristics, such that the robot can complete many complex operation tasks, including a contact operation task.

In fact, a contact operation ability of a robot has brought about tremendous changes, for example, in manufacturing industry, automated production and assembly of robots has become the norm. By using robots to execute contact operation tasks, not only production efficiency and product quality can be improved, but also manual operation risks and work intensity can be reduced. As a result, more and more companies introduce robots to improve their production processes, and have remarkable results. Not only in manufacturing industry, but also in various fields such as medicine or logistics, the contact operation ability of the robot is important.

Robots, however, bring challenges as well as conveniences. Various uncertain factors (such as jitter due to improper operation) in executing contact operation tasks bring about safety problems of the robots, and it is difficult to generate a control signal to control the robot due to high-dimensional spatial configuration of a mobile operation robot. These problems cannot be solved well through conventional control methods. This is because conventional control methods either do not consider force information of the robot in a motion process, or need to generate a track for any scene by understanding geometric constraints of the scene, rather than imitation learning.

To solve at least some of the above problems and other potential problems, the embodiments of the disclosure propose a technical solution for controlling a robot. The technical solution includes: determine, based on a real-time image captured by the robot at a first moment, a reference motion parameter and a reference control force corresponding to the real-time image. The technical solution further includes: determine a target pose and a target control force of the robot at a second moment after the first moment according to the reference motion parameter and the reference control force. The technical solution further includes: determine a target action of the robot at the second moment according to the target pose and the target control force.

An objective of the technical solution for controlling a robot in the example of the disclosure is to make the robot be able to imitate and learn kinematic actions and actual contact forces and moments generated by its end with an environment in a motion process, such that accuracy and robustness of robot control are improved, and the reasonable calculation cost can be guaranteed.

Basic principles and several example implementations of the disclosure are explained below with reference to FIGS. 1-8. It should be understood that these illustrative embodiments are provided only to enable those skilled in the art to better understand and thereby implement the embodiments of the disclosure, and are not intended to limit the scope of the disclosure in any way. Furthermore, in the following description, certain embodiments are discussed with reference to a robot control process in which a robot opens a drawer of a cabinet. However, it should be understood that the embodiments are provided merely to enable those of ordinary skill in the art to better understand the principles and concepts of the embodiments of the disclosure and are not intended to limit the scope of the disclosure in any way:

FIG. 1 is a schematic diagram illustrating an example environment 100 in which a method and/or process according to embodiments of the disclosure may be implemented. As shown in FIG. 1, an example environment 100 includes a database 110 and a robot 120 coupled to each other (for example, through a wire or network), and a target position 130. It should be understood that an arrangement shown in FIG. 1 is illustrative only and the embodiments of the disclosure may also include other different arrangements.

According to the embodiments of the disclosure, the database 110 may store priori data for executing a contact operation of the robot 120. The priori data for executing the contact operation of the robot 120 may include a plurality of tracks for a plurality of tasks. Each track may include an observation image, a motion parameter, a control force, and a termination identifier for each time step (also referred to as moment) during execution of the contact operation of the robot 120. Through the instance, these tracks are obtained, for example, during a certain contact operation (for example, opening a drawer of a cabinet) executed by a mechanical arm 121 of the robot 120 held by an expert. Hereinafter, a detailed process of obtaining the tracks is further described. It should be understood that a manner in which the tracks are obtained is not limited to the above-described manner, and the tracks may also be obtained in other different manners.

The observation image stored in the database 110 are also referred to as a reference image, and may be, for example, a red, green and blue (RGB) image captured at each time step by a camera 123 on the mechanical arm 121 of the robot 120, and may describe an environment surrounding the robot at the time step. In other words, one observation image may be captured at each time step by using the robot 120, and the plurality of observation images captured in this way may be stored in the database. The motion parameter may be a kinematic behavior of the robot 120 in a SE(3) space, indicating translation and rotation of the robot 120 in the SE(3) space. The control forces may be six-dimensional forces for the robot 120, which are push or pull forces in x, y, and z directions and moments about x, y, and z axes respectively. In an example, the control forces may be six-dimensional forces for a joint on the mechanical arm 121 of the robot 120. Hereinafter, the motion parameter and the control force stored in the database 110 are also referred to as a reference motion parameter and a reference control force respectively. The reference motion parameter and the reference control force may be sensed and recorded, for example, by one or more sensors (including, but not limited to, a motion sensor and a force sensor) arranged on the robot 120. The termination identifier, also referred to as a reference termination identifier, may indicate termination of the contact operation of the robot 120.

According to the embodiments of the disclosure, at each time step during execution of the contact operation of the robot 120, a corresponding reference motion parameter and reference control force may be recorded while a reference image is captured, and a corresponding reference termination identifier may be determined. In other words, the reference images stored in the database 110 have a corresponding reference motion parameter, reference control force, and reference termination identifier.

It should be understood that a manner of capturing the reference image, the number and type of the reference image, and a content described in the reference image described herein are illustrative only, and that there may be other different manners of capturing, number and type of images, and contents described. Furthermore, the sensor that records the reference motion parameter and the reference control force for each time step during execution of the contact operation of the robot 120 is not limited to being arranged on the robot 120, but may be a sensor outside the robot 120. Furthermore, as shown in FIG. 1, the database 110 may be arranged separately from the robot 120. However, this is illustrative only, and the database 110 may be arranged inside the robot 120, which is not limited in the disclosure. Moreover, the type of database 110 is not limited in the disclosure. The database 110 may be, for example, a local database or a cloud database.

It should be understood that the reference image is only a representation form (that is, visual representation form) of reference data and that other different representation forms may exist. For example, the reference data may be represented in a form of a reference vector (converting the reference image into a vector or a vector set), or may be represented in a form such as a reference audio, a reference video, etc. Moreover, the database 110 shown in FIG. 1 is merely an illustrative representation of a priori knowledge for executing the contact operation of the robot 120, and the embodiments of the disclosure are not limited to such illustrative representations. For example, the priori knowledge for executing the contact operation of the robot 120 may be obtained in real time directly from an expert (for example, through a network or wire), and alternatively, the reference data may be obtained by imitating contact operations of other robots, etc., which is not limited in the disclosure.

According to the embodiments of the disclosure, the robot 120 illustratively shown in FIG. 1 may include a mechanical arm 121 and a chassis 122, and the mechanical arm 121 may include a camera 123. Through the instance, the mechanical arm 121 may be, for example, a six-degree-of-freedom mechanical arm, the chassis 122 may be, for example, a differential chassis, and the camera 123 may be an RGB camera. It should be understood that only these three assemblies are described herein for ease of illustration, and that the robot 120 may also include more or fewer assemblies, such as one or more sensors. Based on the data from the database 110, the robot 120 may move towards the target position 130 to execute a target operation. Hereinafter, a process for controlling a robot according to the embodiments of the disclosure is described in further detail.

As illustratively shown in FIG. 1, a cabinet may be included at the target position 130, and the target operation in the instance may be opening a drawer of the cabinet. It should be understood that the disclosure is not limited to the target operation in the instance. The target operation that can be executed by using the process for controlling a robot according to the embodiments of the disclosure may also include, for example, turning on a tap, turning on a washing machine, etc. In order to accurately and robustly execute the target operations as described above, a method for controlling the robot 120 according to the embodiments of the disclosure is provided, and such a process for controlling a robot is further described below:

A schematic diagram illustrating an example environment 100 in which a method and/or process according to the embodiments of the disclosure may be implemented is described above in conjunction with FIG. 1. A flowchart of a method 200 for controlling a robot according to embodiments of the disclosure is described below in conjunction with FIG. 2. As described above with respect to the database 110 and the robot 120, the method 200 for controlling a robot according to the embodiments of the disclosure may be executed entirely inside the robot 120, or may be executed distributively by means of external assemblies, which is not limited in the disclosure.

Figure 2:
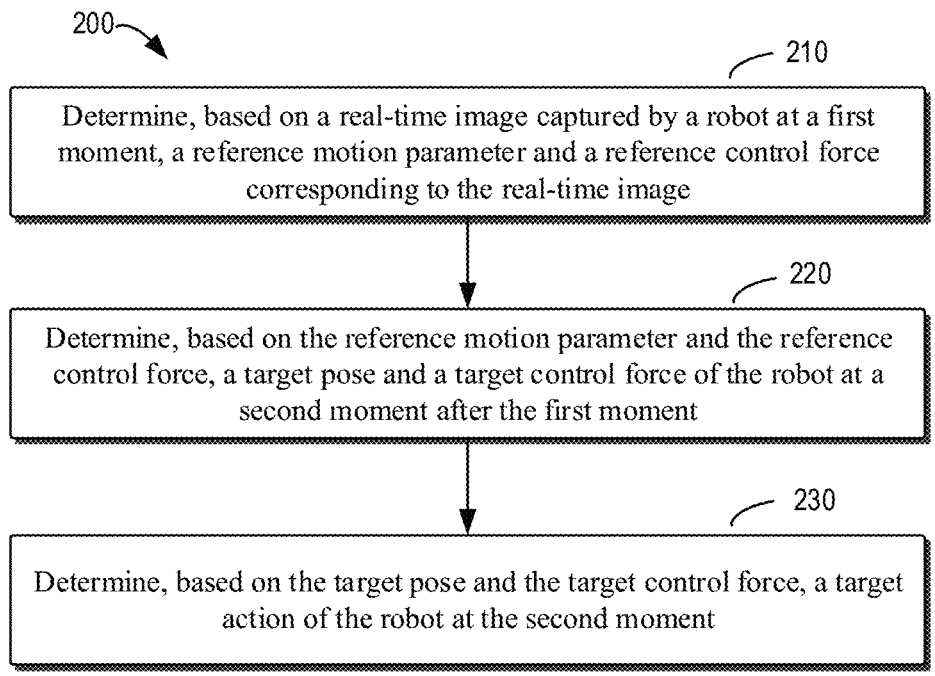
FIG. 2 is a flowchart of a method for controlling a robot according to embodiments of the disclosure.

FIG. 2 is a flowchart of a method 200 for controlling a robot according to embodiments of the disclosure. In order to improve accuracy and robustness of robot control and guarantee a reasonable calculation cost, a method 200 for controlling a robot according to the embodiments of the disclosure is provided. Processes of reference data retrieval and target data prediction according to the embodiments of the disclosure are described in further detail hereinafter. It should be understood that the method 200 according to the disclosure may be executed by a control module of the robot, or may be executed by an external control device.

At 210, determine, based on a real-time image captured by a robot 120 at a first moment, a reference motion parameter and a reference control force corresponding to the real-time image. In a process for controlling a robot according to the embodiments of the disclosure, the robot 120 (including, but not limited to, using the camera 123 on the mechanical arm 121) may capture a real-time image at each time step. The real-time image may, for example, describe a surrounding environment of the robot 120 at the time step. Then reference data corresponding to the real-time image captured at the time step may be determined. A process for determining the corresponding reference data is described in further detail below: As described above, each reference image in the database 110 corresponds to a reference motion parameter and a reference control force. In an example, after the reference image corresponding to the real-time image captured at the time step is determined, a reference motion parameter and a reference control force corresponding to the reference image may be determined. In another example, the real-time image captured at the time step may be sent to the expert, and the expert may return a corresponding reference motion parameter and reference control force based on the real-time image. It should be understood that the disclosure does not limit the number and type of real-time images captured by the robot at each time step, or limit contents described in the real-time images.

At 220, determine a target pose and a target control force of the robot 120 at a second moment after the first moment according to the reference motion parameter and the reference control force. According to the embodiments of the disclosure, after the reference image corresponding to the real-time image captured at the current time step is determined at 210, according to the embodiments of the disclosure, the reference control force corresponding to the reference image may be determined as a target control force of the robot 120 at a next time step, and a target posture of the robot at the next time step may be determined based on the reference motion parameter corresponding to the reference image. Hereinafter, the process of target data prediction according to the embodiments of the disclosure is described in further detail.

At 230, determine a target action of the robot 120 at the second moment according to the target pose and the target control force. According to the embodiments of the disclosure, a target action to be executed by the robot 120 at the next time step may be determined based on the target posture and the target control force of the robot 120 at the next time step determined at 220. In this way, based on the target action determined at each time step, the robot 120 may execute the determined target action time step by time step until the target operation (for example, opening the drawer of the cabinet) is completed.

The method for controlling a robot according to the embodiments of the disclosure makes the robot 120 to not only imitate and learn kinematic actions, but also imitate and learn actual contact forces and moments generated by an end of the robot 120 (for example, the mechanical arm 121 of the robot 120) with an environment in a motion process, such that accuracy and robustness of robot control are improved.

Figure 3:
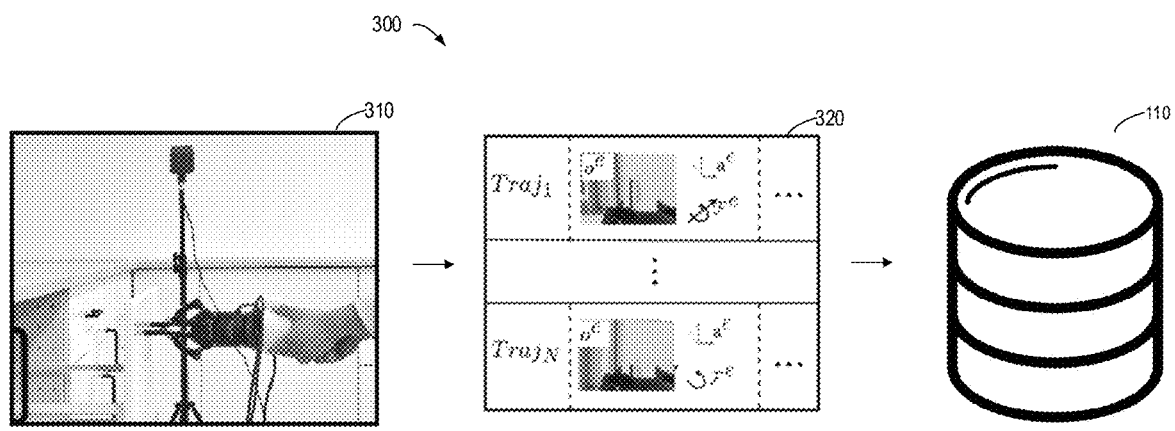
FIG. 3 is a diagram of a process 300 of building a reference database according to embodiments of the disclosure.

FIG. 3 is a diagram of a process 300 of building a reference database according to embodiments of the disclosure. It should be understood that description herein of constructing a reference database or collecting reference data is illustrative only and that there may be other different ways of constructing or collecting.

According to the embodiments of the disclosure, a process of executing a certain contact operation (for example, opening a drawer of a cabinet) by the mechanical arm 121 of the robot 120 held by an expert is shown in 310. At each time step in the process, an image sensor may capture an observation image $o^e$ describing the surrounding environment of the robot 110 at the moment as a reference image. A motion sensor and a force sensor may record a motion parameter $a^e$ and a control force $F^e$ of the robot 110 at the moment as a reference motion parameter and a reference control force. In this way, a plurality of reference images, and a reference motion parameter and a reference control force corresponding to each reference image can be obtained. Alternatively or additionally, when each observation image $o^e$ is captured, a corresponding reference termination identifier $T^e$ may be determined (for example, by an expert). Through the instance, the image sensor may be, for example, a camera on the mechanical arm 121 of the robot 120. It should be understood that the image sensor, the motion sensor, and the force sensor described herein may be arranged on the robot 120, or may be sensors external to the robot 120, that these sensors are illustrative only, and that other different sensors may also be utilized to execute the process for reference data collection described above.

After the reference data is collected in 310, a plurality of tracks may be formed as illustratively shown in 320. According to the embodiments of the disclosure, each of a plurality of tracks for a plurality of tasks (including, but not limited to, opening a drawer of a cabinet, opening a tap, and opening a washing machine, etc.) may include a reference image $o^e$, and a reference motion parameter $a^e$, a reference control force $F^e$, and a reference termination identifier $T^e$ corresponding to the reference image. It should be understood that the plurality of tracks shown in 320 are illustrative only, and that each track may also include more or less information, which is not limited in the embodiments of the disclosure.

The plurality of tracks illustratively shown in 320 may be stored in the database 110 to form a reference database. According to the embodiments of the disclosure, the robot 120 may determine the reference image $o^e$ corresponding to the real-time image $a^t$ captured in real-time from the reference database. A process for determining the corresponding reference image $o^e$ is described in further detail below. By means of the prior knowledge of the contact operations executed by the robot 120 in the reference database, the robot 120 can imitate and learn kinematic actions and actual contact forces and moments generated by its end with an environment in a motion process, such that accuracy and robustness of robot control are improved.

Figure 4:
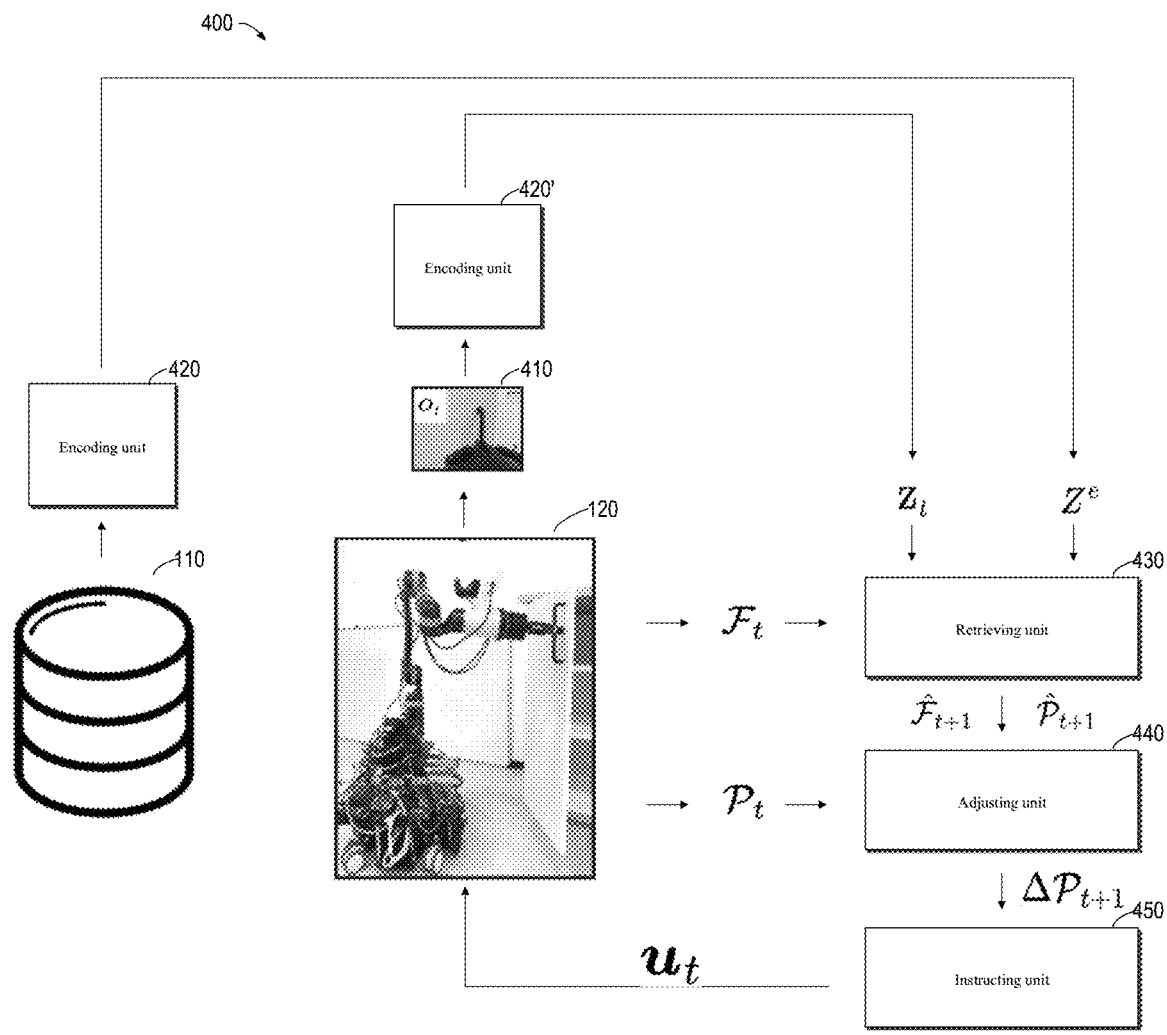
FIG. 4 is a diagram of a process for controlling a robot according to embodiments of the disclosure.

FIG. 4 is a diagram of a process 400 for controlling a robot according to embodiments of the disclosure. It should be understood that the various sub-processes shown in FIG. 4 are illustrative only, and a process 400 for controlling a robot according to the embodiments of the disclosure may include more or fewer sub-processes.

According to the embodiments of the disclosure, the real-time image $o^t$ 410 captured by the robot 120 at the first moment may be encoded as a real-time visual representation $z_t$ of the real-time image $o^t$ 410. As shown in FIG. 4, the real-time image at 410 captured by the robot 120 at the current time step may be encoded into the real-time visual representation $z_t$ by means of an encoding unit 420'. The real-time visual representation $z_t$ is compared to each reference visual representation $Z^e$ of a plurality of reference visual representations $Z^e$ from the database 110, and a similarity between the real-time visual representation $z_t$ and each reference visual representation $Z$ of the plurality of reference visual representations $Z^e$ is obtained. The reference images $o^e$ stored in the database 110 may be encoded by means of the encoding unit 420 as reference visual representations $z^e$, where $z^e \in Z^e$. The real-time visual representation $z_t$ and the reference visual representation $z^e$ may be embeddings of the real-time image $o^t$ 410 and the reference image $o^e$, and the encoding unit 420 and the encoding unit 420' may be pre-trained visual encoders. It should be understood that the encoding unit 420 and the encoding unit 420' may be the same encoder or not, which are not limited in the embodiments of the disclosure. Equation (1) below shows calculation of the similarity between the real-time visual representation $z_t$ and the reference visual representation $z^e$:

$$sim(z_t, z_i^e) = \frac{z_t^T z_i^e}{\|z_i^e\| \|z_t\|} \tag{1}$$

According to the embodiments of the disclosure, a cosine distance may be configured to calculate the similarity between the real-time visual representation $z_t$ and the reference visual representation $z^e$.

According to the embodiments of the disclosure, a reference visual representation that satisfies a predetermined similarity threshold is determined according to the similarity between the real-time visual representation $z_t$ and each reference visual representation $Z^e$ of the plurality of reference visual representations $Z^e$. In an example, for example, a reference visual representation $z^e$ with a greatest similarity to the real-time visual representation $z_t$ may be selected, and a reference image $o^e$ before the reference visual representation $z^e$ is encoded may be determined as a reference image corresponding to the real-time image $o^t$ 410 captured by the robot 120 at the current time step. It should be noted that the example of the disclosure is not limited to a selection and determination process described above, for example, a reference visual representation $z^e$ with a second similarity to the real-time visual representation $z_t$ may be selected. Equation (2) below shows determination of the reference visual representation $z^e$ with the greatest similarity to the real-time visual representation $z_t$:

$$i^* = \arg\max_i sim(z_t, z_i^e) \quad (2)$$

According to the embodiments of the disclosure, the reference motion parameters $a^e$ and the reference control force $F^e$ corresponding to the reference visual representation $z^e$ that is satisfies the predetermined similarity threshold are determined. As described above, each reference image $o^e$ in the database 110 corresponds to a reference motion parameter $a^e$ and a reference control force $F^e$. Thus, after the reference visual representation $z^e$ that satisfies the predetermined similarity threshold is determined, a reference motion parameter $a^e$ and a reference control force $F^e$ corresponding to the reference image $o^e$ before the reference visual representation $z^e$ is encoded may be determined, and the reference motion parameter $a^e$ and the reference control force $F^e$ are retrieved by the retrieving unit 430 of the robot 120. Based on the reference motion parameter $a^e$ and the reference control force $F^e$, a target pose $\hat{\mathcal{P}}_{t+1}$ and a target control force $\hat{\mathcal{F}}_{t+1}$ of the robot 120 at a next time step may be determined. A process for target data prediction according to the embodiments of the disclosure is described in further detail below.

According to the embodiments of the disclosure, the determined reference motion parameter $a^e$ and reference control force $F^e$ of the robot 120 are determined as a real-time motion parameter $a^t$ of the robot 120 at the first moment the target control force $\hat{\mathcal{F}}_{t+1}$ of the robot at the second moment. The determined reference motion parameter $a^e$ of the robot 120 may be determined as a real-time motion parameter $a^t$ of the robot 120 at a current time step, and the determined reference control force $F^e$ of the robot 120 may be determined as a target control force $\hat{\mathcal{F}}_{t+1}$ of the robot 120 at a next time step.

According to the embodiments of the disclosure, the target pose $\hat{\mathcal{P}}_{t+1}$ of the robot at the second moment is determined according to the real-time motion parameter l' and a real-time pose $\mathcal{P}_t$ of the robot 120 at the first moment. Based on the real-time motion parameter $a^t$ and the real-time pose $\mathcal{P}_t$ of the robot 120 at the current time step, the target pose $\hat{\mathcal{P}}_{t+1} = \mathcal{P}_t \circ a_t$ of the robot 120 at the next time step may be obtained, where $\bigcirc$ is a group action in the SE(3) space. It should be understood that the real-time pose $\mathcal{P}_t$ of the robot 120 at the current time step may be sensed by its own sensor or by an external sensor, which is not limited in the example of the disclosure.

The target pose $\hat{\mathcal{P}}_{t+1}$ described above may be inaccurate due to uncertainties caused by positioning and due to insufficient accuracy caused by action prediction. In order to make the target pose $\hat{\mathcal{P}}_{t+1}$ as accurate as possible, the example of the disclosure may use a pose adjustment plan to adjust the target pose $\hat{\mathcal{P}}_{t+1}$. A process for target pose adjustment according to the embodiments of the disclosure is described in further detail below.

According to the embodiments of the disclosure, a real-time control force $F^t$ of the robot 120 at a first moment is obtained. The real-time control force $F^t$ of the robot 120 at the current time step may be monitored by one or more sensors, such as force sensors. It should be understood that the one or more sensors monitoring the real-time control force $F^t$ may be sensors of the robot or sensors arranged outside the robot. The pose adjustment plan for the target pose $\hat{\mathcal{P}}_{t+1}$ may be generated according to the real-time control force $F^t$ of the robot 120 at the current time step and the target control force $\hat{\mathcal{F}}_{t+1}$ at the next time step. The Adjusting unit 440 of the robot 120 may adjust the target pose $\hat{\mathcal{P}}_{t+1}$ by using the generated pose adjustment plan. Generation of the pose adjustment plan for the target pose $\hat{\mathcal{P}}_{t+1}$ is described in further detail below.

According to the embodiments of the disclosure, the pose adjustment plan for the target pose $\hat{\mathcal{P}}_{t+1}$ is generated based on a difference between the real-time control force $F^t$ of the robot at the first moment and the target control force $\hat{\mathcal{F}}_{t+1}$ at the second moment. Equation (3) below shows calculation of an admittance term $\Delta P_{t+1}$:

$$\Delta \mathcal{P}_{t+1} = K_p(\hat{\mathcal{F}}_{t+1} - \mathcal{F}_t) + K_d \frac{\partial(\hat{\mathcal{F}}_{t+1} - \mathcal{F}_t)}{\partial t} \quad (3)$$

$K_p$ and $K_d$ are two gain matrices corresponding to stiffness and damping of an admittance controller respectively. In other words, a virtual spring damping system is established between the end of the robot 120 and a target object (such as a cabinet) on the target position 130. The admittance term $\Delta_{t+1}$ calculated above may be an adjustment amount to the predicted target pose $\hat{\mathcal{P}}_{t+1}$.

According to the embodiments of the disclosure, the target pose $\hat{\mathcal{P}}_{t+1}$ of the robot 120 at the second moment may be adjusted by using the pose adjustment plan. The predicted target post $\hat{\mathcal{P}}_{t+1}$ may be adjusted by using the calculated admittance term $\Delta P_{t+1}$ according to the pose adjustment plan indicating the adjustment amount to the predicted target pose $\hat{\mathcal{P}}_{t+1}$.

According to the embodiments of the disclosure, a control command for the robot 120 is generated according to the adjusted target pose $\hat{\mathcal{P}}_{t+1}$ of the robot 120 at the second moment. After admittance compensation according to the embodiments of the disclosure is utilized, an instructing unit of the robot 120 generates a control command $u_t$ for whole body control according to the adjusted target pose $\hat{\mathcal{P}}_{t+1}$ at the next time step. The generated control command $u_t$ may control the mechanical arm 121 and the chassis 122 of the robot 120. The equation (4) below formulates the whole body control of the robot 120 as a track optimization problem:

$$\min_u L_f(x(t+T)) + \sum_{\tau=t}^{\tau=t+T} L(x(\tau), u(\tau)) \quad (4)$$

$$\text{s.t.} \quad x(\tau+1) = f(x(\tau), u(\tau), \tau)$$
$$x(t) = x_t$$
$$x \in [x_{min}, x_{max}]$$
$$u \in [u_{min}, u_{max}]$$

X is a state variable of a system, and includes a joint state $x_m \in \mathbb{R}^n$ of a joint on the mechanical arm 121 of the robot 120 and a state $x_b = [x, y, \gamma] \in SE(2)$ of the chassis 122. A control vector u includes speed control over the mechanical arm 121 and the chassis 122. $x_t$ is an initial state, f(•) is a transfer function given by equations of system kinematics. Equation (5) below shows a defined loss function:

$$L(x, u) = L_{base} + L_{ee} + u^T R u \qquad (5)$$

$L_{ee}$ and $L_{base}$ are tracking errors of the mechanical arm 121 and the chassis 122 respectively. $L_{ee} = \|\hat{\mathcal{P}}_{t+1} - \mathcal{P}\|^T Q\| \hat{\mathcal{P}}_{t+1} - \mathcal{P}_t\|$.

According to the embodiments of the disclosure, a reference termination identifier $T^e$ corresponding to the reference image $o^e$ is determined from the database 100. As described above, after the reference image $o^e$ corresponding to the real-time image $o^t$ captured by the robot 120 at the current time step is determined, the reference motion parameter $a^e$, the reference control force $F_e$, and the reference termination identifier $T^e$ corresponding to the reference image $o_e$ may be determined. The reference termination identifier $T^e$ may be determined as a target termination representation $T_t$ of the robot 120 at the next time step, and may indicate whether control over the robot 120 is terminated at the next time step, where $T_t \in \{0, 1\}$.

According to the embodiments of the disclosure, control over the robot 120 is terminated in response to control termination indicated by the target termination identifier $T_t$; and the robot 120 is controlled to execute the target action at the next time step in response to control non-termination indicated by the target termination identifier $T_t$. In a case that $T_t=1$, the control may be terminated, otherwise, the target pose $\hat{\mathcal{P}}_{t+1}$ and the target control force $\hat{\mathcal{F}}_{t+1}$ of the robot 120 at the next time step may be determined according to the reference motion parameter $a^e$ of the robot 120 at the current time step and the reference control force $F^e$ at the next time step, and then the target action of the robot 120 at the next time step may be determined.

According to the embodiments of the disclosure, whether the number of times of controlling the robot 120 reaches a predetermined number threshold may be determined. In response to determining that the number of times reaches a predetermined number threshold, control over the robot 120 may be terminated. In response to determining that the number of times does not reach the predetermined number threshold, it may be determined whether the target termination representation $T_t$ of the robot 120 at the next time step indicates control termination.

An algorithm for controlling a robot according to the embodiments of the disclosure is illustratively shown below:

---
Algorithm 1: VisualForceImitation
---
Input:
    D - Expert dataset
    $i_{max}$ - Maximum rollout iteration
1  $Z^e \leftarrow \emptyset$
2  for d $\leftarrow$ D do
3  |  $(o^e, a^e, \mathcal{F}^e) \leftarrow d$
4  |  $z^e \leftarrow$ VisualEncoder($o^e$)
5  |  $Z^e \leftarrow Z^e \cup \{z^e\}$
    |_
6  i $\leftarrow$ 0
7  while i < $i_{max}$ do
8  |  i $\leftarrow$ i + 1
9  |  $(o_t, \mathcal{F}_t, \mathcal{P}_t) \leftarrow$ getCurrentState( )
10 |  $z_t \leftarrow$ VisualEncoder($o_t$)
11 |  $(a_t, \hat{\mathcal{F}}_{t+1}, \mathcal{T}_t) \leftarrow$ Retrieve($z_t, Z^e$)

---
Algorithm 1: VisualForceImitation
---
12 |  if $\mathcal{T}_t = 1$ then
13 |  |  return
    |_
14 |  $\hat{\mathcal{P}}_{t+1} \leftarrow \mathcal{P}_t \circ a_t$
15 |  $\Delta \mathcal{P}_{t+1} \leftarrow$ Admittance($\mathcal{P}_t, \hat{\mathcal{P}}_{t+1}, \mathcal{F}_t, \hat{\mathcal{F}}_{t+1}$)
16 |  $\hat{\mathcal{P}}_{t+1} \leftarrow \hat{\mathcal{P}}_{t+1} \circ \Delta \mathcal{P}_{t+1}$
17 |  WholeBodyControl($\hat{\mathcal{P}}_{t+1}$)
    |_
18 return Visual Encoder ( ) is visual encoding of an image (such as the real-time image $o^t$ or the reference image $o^e$). getCurrentState ( ) is to get the current state, that is, the real-time image $o^t$, the real-time control force $F^t$ and the real-time pose $P_t$. Retrieve ( ) is to retrieve data from, for example, a database. Admittance ( ) is admittance, and WholeBodyControl ( ) is whole body control.

Figure 5:
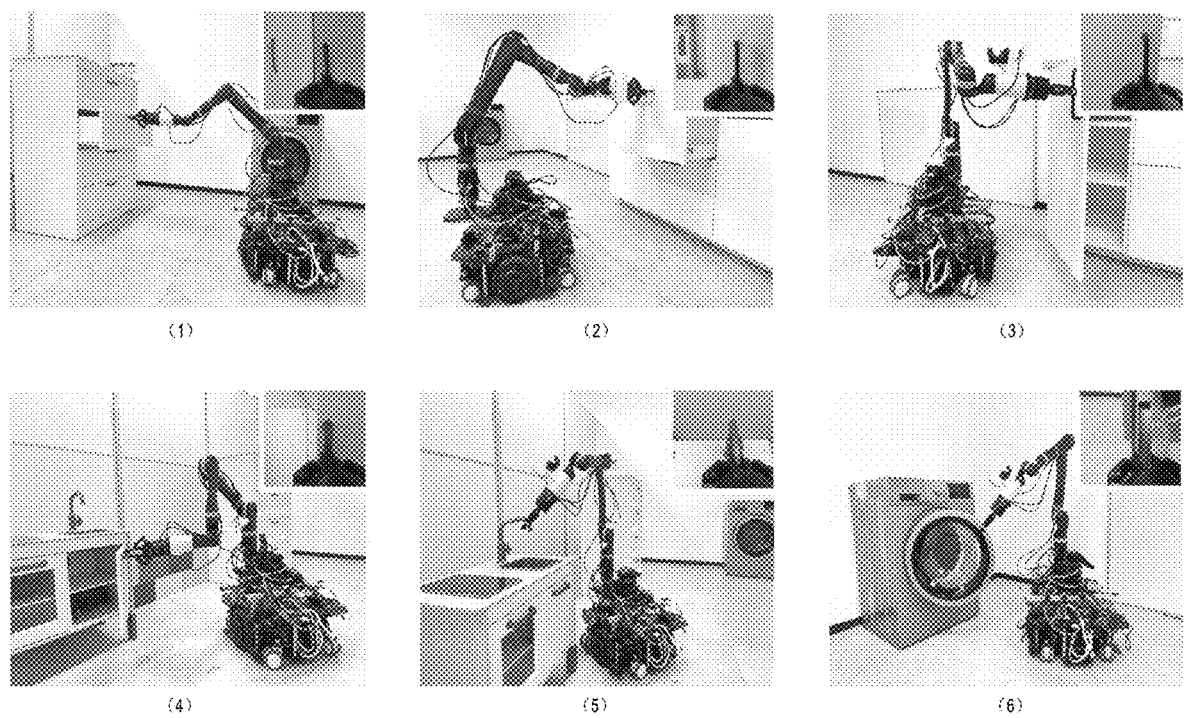
FIG. 5 shows an example of a target operation executed through robot control according to embodiments of the disclosure.

FIG. 5 shows an example of a target operation executed through robot control according to embodiments of the disclosure. As shown in FIG. 5 (1), the robot 120 is in a process of opening a drawer of a cabinet. As shown in FIG. 5 (2), the robot 120 has opened a top drawer of the cabinet. FIGS. 5 (3), and (4) show that the robot 120 opens a left door and a 10 right door of the cabinet. FIGS. 5 (5) and (6) show that the robot 120 turns on a tap and opens a washing machine respectively. It should be noted that the target operations that can be executed through robot control according to the embodiments of the disclosure are not limited to the instance shown in FIG. 5, and may also include other different target operations.

Figure 6:
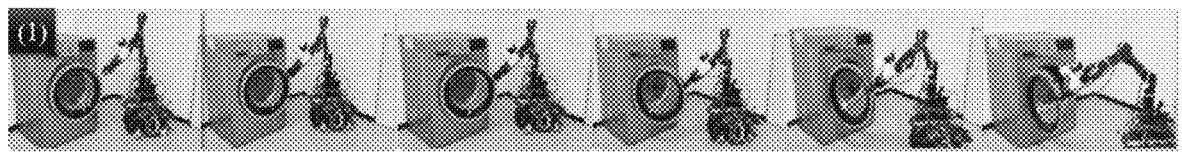
FIG. 6 shows an example process of executing a target operation through robot control according to embodiments of the disclosure.
Figure 6:
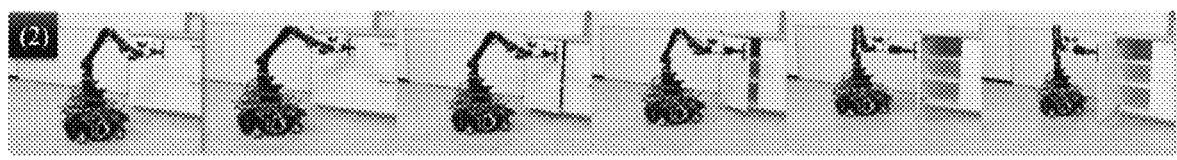
Figure 6:
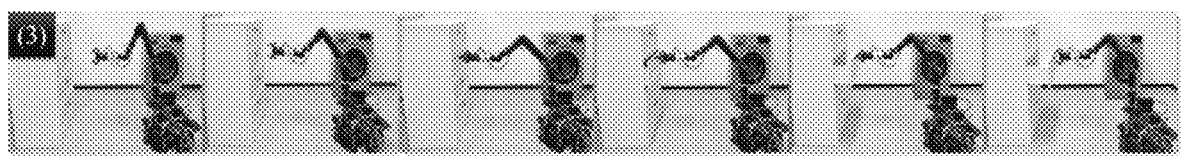
Figure 6:
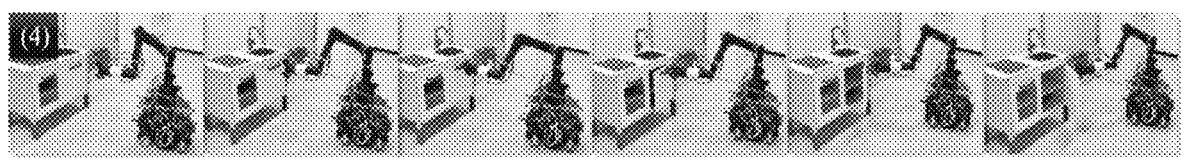
Figure 6:
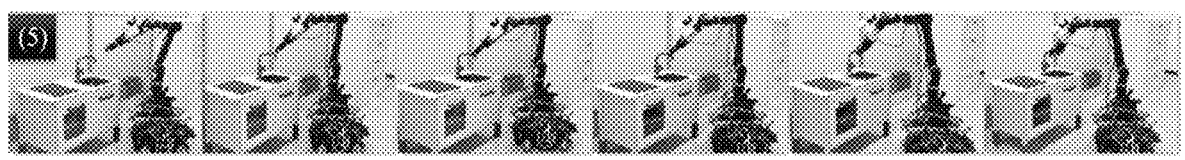
Figure 6:
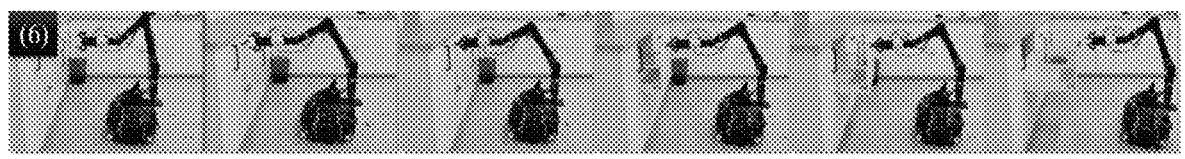

FIG. 6 shows an example process of executing a target operation through robot control according to embodiments of the disclosure. As shown in FIG. 6 (1), the robot 120 slowly approaches a washing machine at the target position 130 and open the washing machine. An order of six images shown in FIG. 6 (1) from left to right corresponds to an order of time steps in which the robot 120 opens the washing machine respectively. In other words, FIG. 6 (1) shows that the robot 120 executes the target operation of opening the washing machine time step by time step.

Similarly, FIGS. 6 (2), (3), and (4) show that the robot 120 executes target operations of opening a left door, a drawer, and a right door of a cabinet time step by time step respectively. FIGS. 6 (5) and (6) show that the robot 120 executes target operations of turning on a tap and opening a top drawer of the cabinet time step by time step respectively. It should be noted that a number of time frames shown for each instance process in FIG. 6 is illustrative only.

As shown in various instances in FIG. 6, using fine control over a differential chassis and a mechanical joint according to the embodiments of the disclosure enables the robot 120 to have greater flexibility and adaptability to accomplish numerous complex contact tasks.

Figure 7:
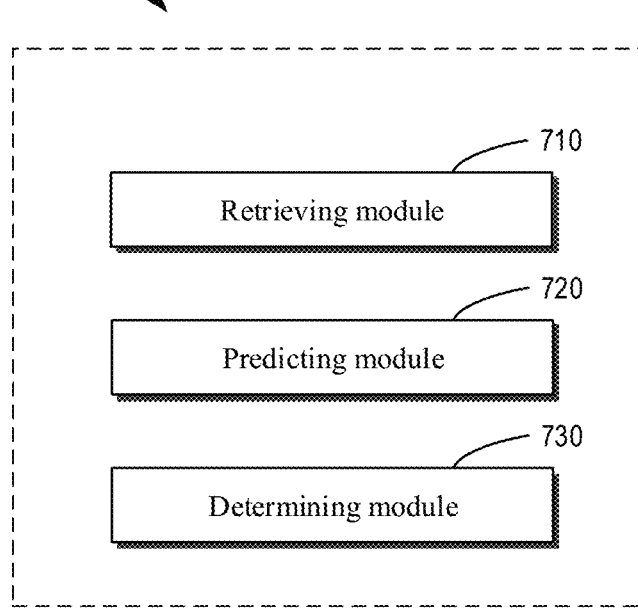
FIG. 7 is a block diagram of a device for controlling a robot according to embodiments of the disclosure.

The various example processes shown in FIG. 6 demonstrate utility and convenience. Such robot control can FIG. 7 is a block diagram of an apparatus 700 for controlling a robot according to embodiments of the disclosure. As shown in FIG. 7, the apparatus 700 includes a retrieving module 710 configured to determine, based on a real-time image captured by the robot at a first moment, a reference motion parameter and a reference control force corresponding to the real-time image. The apparatus 700 further includes a predicting module 720 configured to determine a target pose and a target control force of the robot at a second moment after the first moment according to the reference motion parameter and the reference control force. The apparatus 700 further includes a determining module 730 configured to determine a target action of the robot at the second moment according to the target pose and the target control force. The apparatus 700 may further include other modules to implement the methods and/or processes according to the embodiments of the disclosure, which are not repeated herein for brevity.

It should be appreciated that at least some of the advantages enabled by the methods or processes described above may be achieved by the apparatus 700 of the disclosure. For example, a kinematic action can be imitated and learned, and actual contact forces and moments generated by an end of the robot 120 with an environment in a motion process can also be imitated and learned, such that accuracy and robustness of robot control can be improved, and the reasonable calculation cost can be guaranteed.

Figure 8:
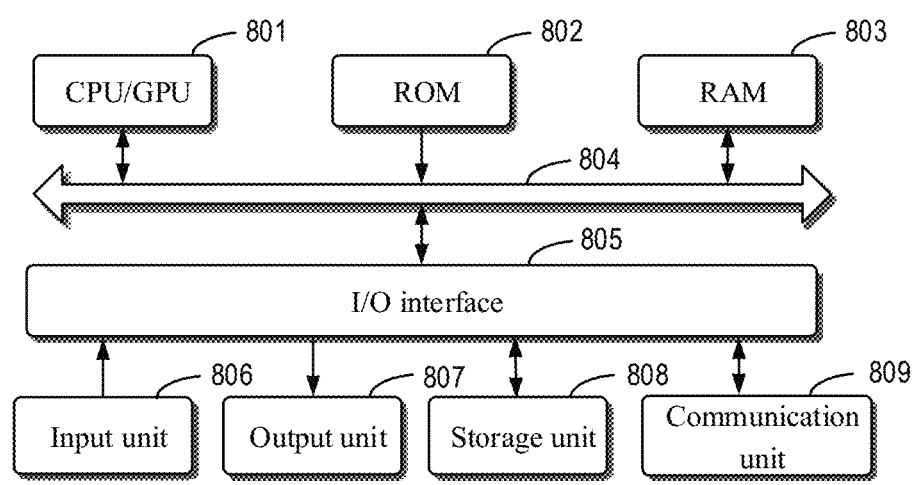
FIG. 8 is a schematic block diagram of an example device that may be configured to implement examples according to the disclosure.

FIG. 8 is a block diagram of an electronic device 800 according to certain embodiments of the disclosure. The device 800 may be a device or an apparatus described in the example of the disclosure. As shown in FIG. 8, the device 800 includes a central processing unit (CPU) and/or a graphics processing unit (GPU) 801 that may execute various appropriate actions and processes in accordance with a computer program instruction stored in a read only memory (ROM) 802 or a computer program instruction loaded from a storage unit 808 into a random access memory (RAM) 803. The RAM 803 may also store various programs and data required for operation of the device 800. The CPU/GPU 801, the ROM 802, and the RAM 803 are connected to each other by means of a bus 804. An input/output (I/O) interface 805 is also connected to the bus 804. Although not shown in FIG. 8, the device 800 may also include a coprocessor.

A plurality of components in the device 800 are connected to the I/O interface 805 and includes: an input unit 806, for example, a keyboard, a mouse, etc.: an output unit 807, for example, various types of displays, speakers, etc.: a storage unit 808, for example, a magnetic disk, an optical disk, etc.; and a communication unit 809, for example, a network card, a modem, a wireless communication transceiver, etc. The communication unit 809 allows the device 800 to exchange information/data with other devices by means of a computer network such as the Internet and/or various telecommunication networks.

The various methods or processes described above may be executed by the CPU/GPU 801. For example, in some examples, the method may be implemented as a computer software program tangibly embodied in a machine-readable medium, for example, the storage unit 808. In some examples, part or all of the computer program may be loaded and/or installed onto the device 800 by means of the ROM 802 and/or the communication unit 809. When the computer program is loaded into the RAM 803 and executed by the CPU/GPU 801, one or more of steps of the methods or processes described above may be executed.

In some examples, the methods and processes described above may be implemented as a computer program product. The computer program product may include a computer-readable storage medium carrying a computer-readable program instruction configured to execute aspects of the disclosure.

The computer-readable storage medium may be a tangible device that can retain and store instructions for use by an instruction execution device. The computer-readable storage medium may include, but is not limited to, an electrical storage device, a magnetic storage device, an optical storage device, an electromagnetic storage device, a semiconductor storage device, or any suitable combination of the foregoing. More specific instances (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read only memory (CD-ROM), a digital versatile disk (DVD), a memory stick, a floppy disk, a mechanically encoded device, such as a punch card or a raised structure in a groove having storing an instruction, and any suitable combination of the foregoing. As used herein, the computer-readable storage medium is not to be interpreted as a transient signal, such as radio waves, other freely propagating electromagnetic waves, electromagnetic waves propagating through a waveguide or other transmission medium (for example, optical pulses passing through a fiber optic cable), or electrical signals transmitted through a wire.

The computer-readable program instruction described herein may be downloaded from the computer-readable storage medium to various computing/processing devices, or to an external computer or external storage device over a network, such as the Internet, a local area network, a wide area network, and/or a wireless network. The network may include a copper transmission cable, fiber optic transmission, wireless transmission, a router, a firewall, a switch, a gateway computer, and/or an edge server. A network adapter card or network interface in each computing/processing device receives the computer-readable program instruction from the network and forwards the computer-readable program instruction for storage in the computer-readable storage medium in the respective computing/processing device.

The computer program instruction configured to execute the operations of the disclosure may be an assembly instruction, an instruction set architecture (ISA) instruction, a machine instruction, a machine dependent instruction, a microcode, a firmware instruction, state setting data, or a source code or object code written in any combination of one or more programming languages. The programming languages include object-oriented programming languages, and conventional procedural programming languages. The computer-readable program instruction may be executed entirely on a user computer, partly on a user computer, as a standalone software package, partly on a user computer and partly on a remote computer, or entirely on a remote computer or server. In the case involving a remote computer, the remote computer may be connected with a user computer through any kind of network, including a local area network (LAN) or a wide area network (WAN), or may be connected with an external computer (for example, connected through the Internet by using an Internet service provider). In some examples, an electronic circuit, such as a programmable logic circuit, a field programmable gate array (FPGA), or a programmable logic array (PLA), may be personalized by using state information of the computer-readable program instruction. The electronic circuit may execute the computer-readable program instruction to implement aspects of the disclosure.

These computer-readable program instructions may be provided for a processing unit of a general purpose computer, a special purpose computer, or other programmable data processing apparatus, such that a machine is produced. Thus the instructions create devices for implementing functions/actions specified in one or more blocks of the flowcharts and/or the block diagrams when executed by the processing unit of the computer or other programmable data processing apparatus. These computer-readable program instructions may also be stored in a computer-readable storage medium. The instructions cause the computer, programmable data processing apparatus, and/or other devices to function in a particular manner, such that the computer-readable medium storing the instructions includes a manufactured article including instructions which implement aspects of the functions/actions specified in one or more blocks of the flowchart and/or the block diagrams.

The computer-readable program instructions may also be loaded onto a computer, other programmable data processing apparatus, or other devices to cause a series of operational steps to be executed on the computer, the other programmable data processing apparatus, or other devices, and then a computer implemented process is produced, such that the instructions executed on the computer, the other programmable data processing apparatus, or the other devices implement the functions/actions specified in one or more blocks of the flowchart and/or the block diagrams.

The flowcharts and the block diagrams in the accompanying drawings illustrate the architecture, functionality, and operations possibly implemented by the devices, methods, and computer program products according to the plurality of embodiments of the disclosure. In this regard, each block in the flowcharts or the block diagrams may represent a module, a program segment, or part of an instruction. The module, the program segment, or part of the instruction includes one or more executable instructions for implementing a specified logical function. In some alternative implementations, a function noted in a block may occur in a different order than an order noted in the figures. For example, two consecutive blocks may actually be executed substantially in parallel, or in reverse order sometimes, depending on a function involved. It should also be noted that each block in the block diagrams and/or flowcharts, and combinations of blocks in the block diagrams and/or flowcharts, can be implemented by special purpose hardware-based systems that execute specified functions or actions, or can be implemented by combinations of special purpose hardware and computer instructions.

Various embodiments of the disclosure above are described, the above description is illustrative and not exhaustive, nor is it limited to the various examples disclosed. Many modifications and variations are apparent to those of ordinary skill in the art without departing from the scope and spirit of the various examples described. The terms used herein was chosen to best explain the principles of the various examples, practical application or technical improvement over technology in the marketplace, or to make others of ordinary skill in the art understand the various examples disclosed herein.

We claim:

1. A method for controlling a robot, comprising:
   determining, by a controller of the robot and based on a real-time image captured by the robot at a first moment, a reference motion parameter and a reference control force corresponding to the real-time image;
   determining, by the controller and based on the reference motion parameter and the reference control force, a target pose and a target control force of the robot at a second moment after the first moment; and
   determining, by the controller and based on the target pose and the target control force, a target action of the robot at the second moment,
   wherein the method further comprises:
   obtaining, by a force sensor of the robot, a real-time control force of the robot at the first moment;
   generating, by the controller, a pose adjustment plan for the target pose according to a difference between the real-time control force and the target control force of the robot at the second moment;
   adjusting, by an adjuster of the robot, the target pose by means of the pose adjustment plan;
   generating, by an instructing unit of the robot and based on the adjusted target pose of the robot at the second moment, a control command for the robot; and
   controlling, by the controller and based on the control command, at least one of a mechanical arm and a chassis of the robot to execute the target action at the second moment.

2. The method according to claim 1, wherein the determining of the reference motion parameter and the reference control force corresponding to the real-time image comprises:
   determining a reference image corresponding to the real-time image from a database; and
   obtaining the reference motion parameter and the reference control force of the robot corresponding to the reference image.

3. The method according to claim 2, further comprising:
   encoding the real-time image captured by the robot at the first moment as a real-time visual representation of the real-time image;
   obtaining a similarity between the real-time visual representation and each of a plurality of reference visual representations from the database by comparing the real-time visual representation to each of the plurality of reference visual representations; and
   determining a reference visual representation that satisfies a predetermined similarity threshold based on the similarity between the real-time visual representation and each of the plurality of reference visual representations.

4. The method according to claim 3, wherein
   the plurality of reference visual representations from the database are obtained by encoding a plurality of reference images captured by the robot, and
   each of the plurality of reference images corresponds to the reference motion parameter and the reference control force of the robot.

5. The method according to claim 3, wherein the determining of the target pose and the target control force of the robot at the second moment after the first moment comprises:
   determining the reference motion parameters and the reference control force of the robot corresponding to the reference visual representation that satisfies the predetermined similarity threshold; and
   determining, based on the reference motion parameter and the reference control force, the target pose and the target control force of the robot at the second moment.

6. The method according to claim 5, wherein the determining of the target pose and the target control force of the robot at the second moment after the first moment further comprises:
   determining the determined reference motion parameter and reference control force of the robot as a real-time motion parameter of the robot at the first moment and the target control force of the robot at the second moment; and
   determining, based on the real-time motion parameter and a real-time pose of the robot at the first moment, the target pose of the robot at the second moment.

7. The method according to claim 2, further comprising:
determining a reference termination identifier of the robot corresponding to the reference image from the database;
determining the reference termination identifier as a target termination identifier of the robot at the second moment;
terminating control over the robot in response to control termination indicated by the target termination identifier; and
controlling the robot to execute the target action at the second moment in response to control non-termination indicated by the target termination identifier.

8. The method according to claim 7, wherein
the pose adjustment plan indicates an adjustment amount of the target pose of the robot at the second moment, and
the adjustment amount is associated with stiffness and damping of a virtual spring damping system between the robot and a target position of a target operation to be executed.

9. The method according to claim 7, further comprising:
determining whether the number of times of controlling the robot reaches a predetermined number threshold;
terminating control over the robot in response to determining that the number of times reaches the predetermined number threshold; and
determining whether the target termination identifier indicates control termination in response to determining that the number of times does not reach the predetermined number threshold.

10. A non-transitory computer-readable storage medium, storing a computer-executable instruction that when executed by a controller of a robot, causes the robot to:
determine, by the controller and based on a real-time image captured by the robot at a first moment, a reference motion parameter and a reference control force corresponding to the real-time image;
determine, by the controller and based on the reference motion parameter and the reference control force, a target pose and a target control force of the robot at a second moment after the first moment; and
determine, by the controller and based on the target pose and the target control force, a target action of the robot at the second moment,
wherein the robot is further caused to:
obtain, by a force sensor of the robot, a real-time control force of the robot at the first moment;
generate, by the controller, a pose adjustment plan for the target pose according to a difference between the real-time control force and the target control force of the robot at the second moment;
adjust, by an adjuster of the robot, the target pose by means of the pose adjustment plan;
generate, by an instructing unit of the robot and based on the adjusted target pose of the robot at the second moment, a control command for the robot; and
control, by the controller and based on the control command, at least one of a mechanical arm and a chassis of the robot to execute the target action at the second moment.

11. The non-transitory computer-readable storage medium according to claim 10, wherein the determining of the reference motion parameter and the reference control force corresponding to the real-time image comprises:
determining a reference image corresponding to the real-time image from a database; and
obtaining the reference motion parameter and the reference control force of the robot corresponding to the reference image.

12. An electronic device, comprising:
a controller comprising a processor; and
a memory coupled to the controller, wherein the memory stores an instruction that, when executed by the controller, causes the electronic device to:
determine, by the controller and based on a real-time image captured by the robot at a first moment, a reference motion parameter and a reference control force corresponding to the real-time image;
determine, by the controller and based on the reference motion parameter and the reference control force, a target pose and a target control force of the robot at a second moment after the first moment; and
determine, by the controller and based on the target pose and the target control force, a target action of the robot at the second moment,
wherein the electronic device is further caused to:
obtain, by a force sensor of the electronic device, a real-time control force of the robot at the first moment;
generate, by the controller, a pose adjustment plan for the target pose according to a difference between the real-time control force and the target control force of the robot at the second moment;
adjust, by an adjuster of the electronic device, the target pose by means of the pose adjustment plan;
generate, by an instructing unit of the robot and based on the adjusted target pose of the robot at the second moment, a control command for the robot; and
control, by the controller and based on the control command, at least one of a mechanical arm and a chassis of the robot to execute the target action at the second moment.

13. The electronic device according to claim 12, wherein the determining of the reference motion parameter and the reference control force corresponding to the real-time image comprises:
determining a reference image corresponding to the real-time image from a database; and
obtaining the reference motion parameter and the reference control force of the robot corresponding to the reference image.

14. The electronic device according to claim 13, the electronic device is further caused to:
encode the real-time image captured by the robot at the first moment as a real-time visual representation of the real-time image;
obtain a similarity between the real-time visual representation and each of a plurality of reference visual representations from the database by comparing the real-time visual representation to each of the plurality of reference visual representations; and
determine a reference visual representation that satisfies a predetermined similarity threshold based on the similarity between the real-time visual representation and each of the plurality of reference visual representations.

15. The electronic device according to claim 14, wherein
the plurality of reference visual representations from the database are obtained by encoding a plurality of reference images captured by the robot, and
each of the plurality of reference images corresponds to the reference motion parameter and the reference control force of the robot.

16. The electronic device according to claim 14, wherein the determining of the target pose and the target control force of the robot at the second moment after the first moment comprises:
- determining the reference motion parameters and the reference control force of the robot corresponding to the reference visual representation that satisfies the predetermined similarity threshold; and
- determining, based on the reference motion parameter and the reference control force, the target pose and the target control force of the robot at the second moment.

17. The electronic device according to claim 16, wherein the determining of the target pose and the target control force of the robot at the second moment after the first moment further comprises:
- determining the determined reference motion parameter and reference control force of the robot as a real-time motion parameter of the robot at the first moment and the target control force of the robot at the second moment; and
- determining, based on the real-time motion parameter and a real-time pose of the robot at the first moment, the target pose of the robot at the second moment.

\* \* \* \* \*